(12) United States Patent
Lavrut et al.

(10) Patent No.: US 6,970,398 B2
(45) Date of Patent: Nov. 29, 2005

(54) PRESSURE PULSE GENERATOR FOR DOWNHOLE TOOL

(75) Inventors: Eric Lavrut, Le Plessis Robinson (FR); Adame Kante, Houston, TX (US); Peter Rellinger, Cypress, TX (US); Steve R. Gomez, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 329 days.

(21) Appl. No.: 10/248,673

(22) Filed: Feb. 7, 2003

(65) Prior Publication Data

US 2004/0156265 A1 Aug. 12, 2004

(51) Int. Cl.⁷ .............................................. H04H 9/00
(52) U.S. Cl. ....................................... 367/84; 415/55.2
(58) Field of Search ...................... 367/84; 415/55.2; 73/861.79

(56) References Cited

U.S. PATENT DOCUMENTS

| | | |
|---|---|---|
| 3,309,656 A | 3/1967 | Godbey |
| 3,739,331 A | 6/1973 | Godbey et al. |
| 3,770,006 A | 11/1973 | Sexton et al. |
| 4,134,100 A | 1/1979 | Funke |
| 4,147,223 A | 4/1979 | Patton |
| 4,189,705 A | 2/1980 | Pitts, Jr. |
| 4,562,560 A | 12/1985 | Kamp |
| 4,647,853 A | 3/1987 | Cobern |
| 4,675,852 A | 6/1987 | Russell et al. |
| 4,691,203 A | 9/1987 | Rubin et al. |
| 4,734,892 A | 3/1988 | Kotlyar |
| 4,839,870 A | 6/1989 | Scherbatskoy |
| 4,847,815 A | 7/1989 | Malone |
| 4,914,433 A | 4/1990 | Galle |
| 4,914,637 A | 4/1990 | Goodsman |
| 4,953,595 A | 9/1990 | Kotlyar |
| 4,956,823 A | 9/1990 | Russell et al. |
| 4,979,112 A | 12/1990 | Ketcham |
| 5,073,877 A | 12/1991 | Jeter |
| 5,146,433 A | 9/1992 | Kosmala et al. |
| 5,182,731 A | 1/1993 | Hoelscher et al. |
| 5,197,040 A | 3/1993 | Kotlyar |
| 5,237,540 A | 8/1993 | Malone |
| 5,249,161 A | 9/1993 | Jones et al. |
| 5,357,483 A | 10/1994 | Innes |
| 5,375,098 A | 12/1994 | Malone et al. |
| 5,517,464 A | 5/1996 | Lerner et al. |
| 5,586,083 A | 12/1996 | Chin et al. |

(Continued)

FOREIGN PATENT DOCUMENTS

EP 0 140 788 A2 5/1985

(Continued)

*Primary Examiner*—Albert K. Wong
(74) *Attorney, Agent, or Firm*—Jennie (JL) Salazar; Victor H. Segura; Dale Gaudier (57) ABSTRACT

A pressure pulse generator for a downhole drilling tool is provided. The pressure pulse generator includes a stator with an orifice through which a stream of fluid passes, and a rotor intended to rotate opposite the stator to allow the flow of more or less liquid exiting the orifice of the stator. The rotor is equipped with an orifice, and the two orifices present a communicating area for the passage of the stream of fluid. The rotor is capable of passing fluid therethrough. A turbine with blades rotatable in response to fluid flow through the rotor may also be provided. The turbine is operatively connected to the rotor via a drive shaft. The fluid flow through the rotor may be used to rotate the turbine and provide power usable in the downhole tool.

37 Claims, 12 Drawing Sheets

U.S. PATENT DOCUMENTS

| | | |
|---|---|---|
| 5,636,178 A | 6/1997 | Ritter |
| 5,740,126 A | 4/1998 | Chin et al. |
| 5,740,127 A | 4/1998 | Van Steenwyk et al. |
| 5,787,052 A | 7/1998 | Gardner et al. |
| 5,806,612 A | 9/1998 | Vorhoff et al. |
| 5,831,177 A | 11/1998 | Waid et al. |
| 6,050,349 A | 4/2000 | Rountree et al. |
| 6,219,301 B1 * | 4/2001 | Moriarty .................. 367/84 |
| 6,626,253 B2 * | 9/2003 | Hahn et al. ............... 175/48 |
| 6,714,138 B1 | 3/2004 | Turner et al. |

FOREIGN PATENT DOCUMENTS

| | | |
|---|---|---|
| EP | 0 080 218 B1 | 12/1987 |
| EP | 0 309 030 A1 | 3/1989 |
| EP | 0 535 815 A1 | 4/1993 |
| EP | 0 916 807 A2 | 5/1999 |
| EP | 0 916 807 A3 | 10/2001 |

\* cited by examiner

PRESSURE PULSE GENERATOR FOR DOWNHOLE TOOL

BACKGROUND OF INVENTION

This invention relates to a pressure pulse generator. Such a pressure pulse generator is usable in particular in the area of drilling, and more specifically in a logging-while-drilling and/or measuring-while-drilling tool.

In these techniques, drilling is accomplished using a string of drillpipe that terminates in a drilling tool. The logging and/or measuring tools are located near the drilling tool, downhole, in a drillpipe in the string. Logging or measurement data are transmitted to the surface.

There are various existing methods of achieving this transmission. It may be achieved through electrical signals using the electrical conductors that pass through the drillpipe string. Transmission may also be achieved through acoustic signals transmitted through the drillpipes in the string. These methods permit a relatively high transmission flow rate. But the former of these techniques is relatively expensive to implement and poses problems for the connection of the conductors at the joint between drillpipes in the string. As for the latter, it lacks reliability due to the high degree of noise generated during drilling.

A conventional data transmission technique uses the drilling fluid as a means of transmitting depth-modulated acoustic waves representative of the logging and/or measurement tool response.

Figure 1:
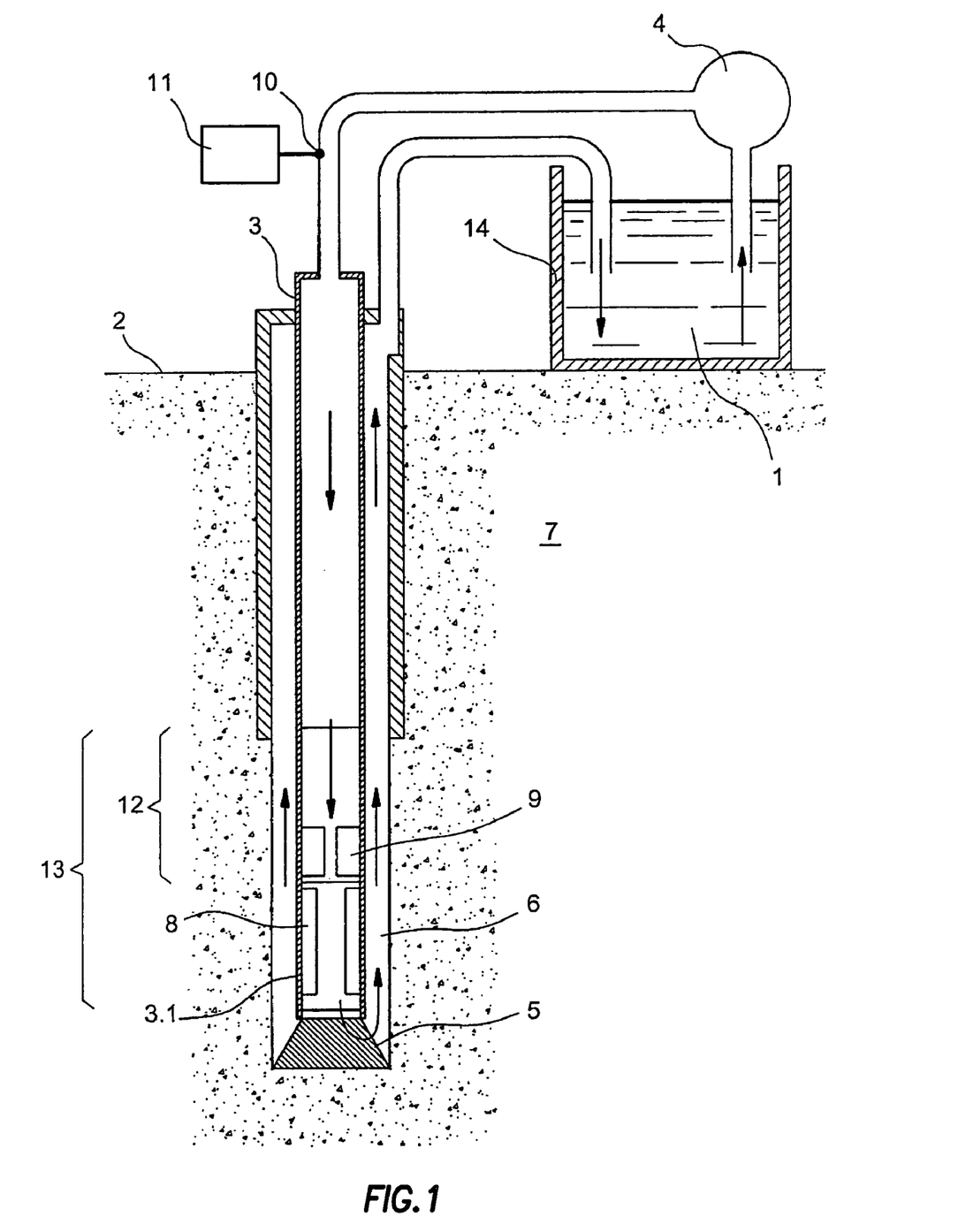
FIG. 1 (already described) shows a drilling device equipped with a logging-and/or measuring-while-drilling tool that can be equipped with a pressure pulse generator according to the invention.

FIG. 1 illustrates a drilling device capable of making such logs and/or measurements. This device can be equipped with a pressure pulse generator according to the invention.

A drilling fluid 1 contained in a tank 14 is injected by a pump 4 from the surface 2 to the inside of a drillpipe string 3 intended to drill into a geological formation 7. The drilling fluid 1 arrives at a drill bit 5 at the end of the drillpipe string 3. The drilling fluid 1 exits the drillpipe string 3 and returns to the surface 2 through the space 6 between the drillpipe string 3 and the geological formation 7. The route of the drilling fluid 1 is illustrated by the arrows.

One of the drillpipes 3.1 in the drillpipe string 3 that is near the drill bit 5 is instrumented. This instrumented drillpipe 3.1 contains at least one measurement device 8 intended among other things to evaluate the physical properties of the geological formation, such as its density, porosity, resistivity, etc. This measurement device 8 is part of a logging-while-drilling or LWD tool 13.

When this measuring device 8 measures drilling-related parameters such as temperature, pressure, drilling tool orientation, etc., it is part of a measuring-while-drilling or MWD tool.

The instrumented drillpipe 3.1 is generally a drill collar. This is a drillpipe that is heavier than the others. It applies sufficient weight to the drill bit 5 to drill into the geological formation 7.

In order to produce a pressure fluctuation in the drilling fluid 1, and thereby transmit data, a pressure pulse generator 9 is placed in the instrumented drillpipe 3.1 just above the area that contains the measurement devices 8. The pressure pulse generator 9 is part of a telemetry module 12 whose function is to control data transmission between the downhole measurement device 8 and the pressure sensors 10 at the surface. The telemetry module 12 is part of the logging-and/or measurement-while-drilling tool.

U.S. Pat. No. 3,309,656 describes a rotating pressure pulse generator. Rotating at a constant speed, it partially but repeatedly interrupts the flow of the drilling fluid 1. The interruptions cause the pressure pulse generator to generate pressure pulses at a carrier frequency that is proportional to the interruption rate. Accelerating or decelerating the generator modulates the phase or the frequency of the pressure waves to transmit the data associated with the measurements made by the measurement device 8 to the surface 2. Pressure sensors 10 at the surface 2 receive the pressure waves that are propagated in the drilling fluid 1. Before being demodulated, the acoustic signal representing the pressure waves sensed at the surface is filtered in a processing device 11 to eliminate the noise which is inevitable. The assembly formed by the telemetry module 12 including the pressure pulse generator 9, the processing device 11, and the pressure sensors 10 is hereinafter called the "telemetry system."

Due to the drilling fluid, which is generally mud, the acoustic signal recovered at the surface is highly attenuated. This limits the performance of pressure pulse telemetry systems.

Figure 2A:
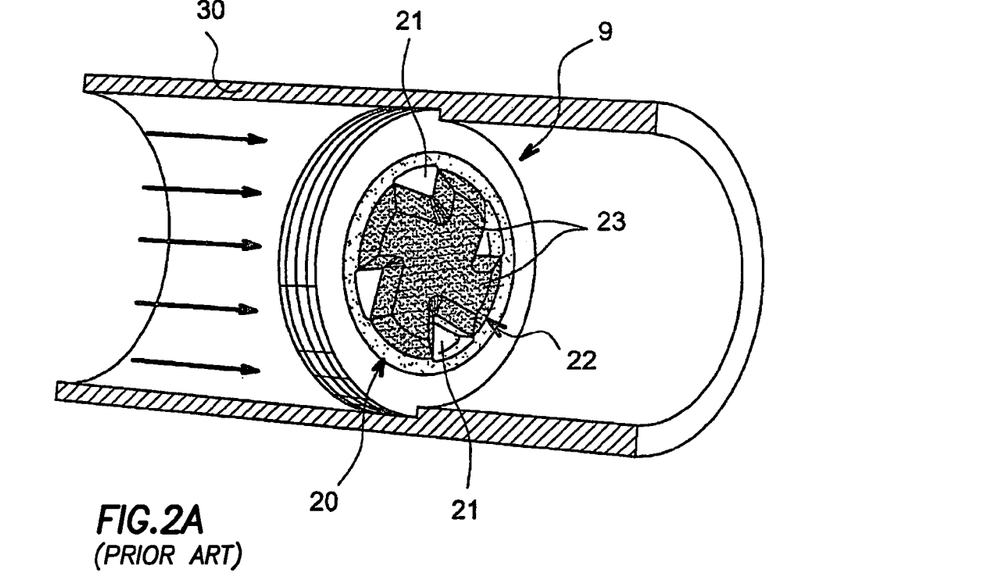
FIGS. 2A, 2B (already described) show a prior art pressure pulse generator in the open and closed positions, respectively.
Figure 2B:
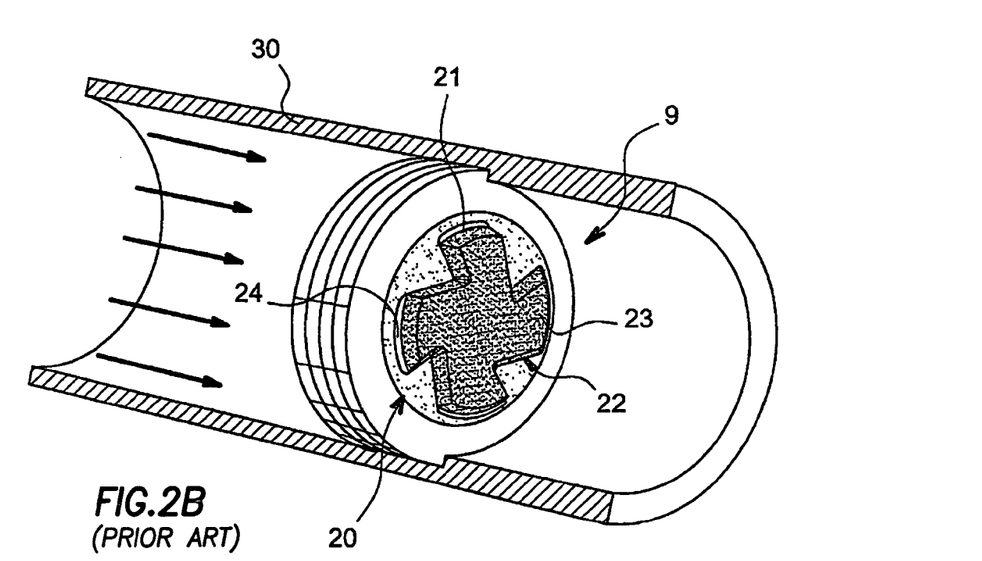

Although rotating pressure pulse generators have been improved in the past ten years, they still have weaknesses. U.S. Pat. No. 6,219,301 describes a conventional but more recent pressure pulse generator. Referring to FIGS. 2A and 2B, the pressure pulse generator 9 shown has a stator 20 with several peripheral orifices 21 and a rotor 22 with blades 23 in the form of a cross. The rotor 22 is rotated near the stator 20 by a motor (not shown). The drilling fluid, whose displacement is illustrated by the arrows in the figures, goes through the peripheral orifices 21 of the stator 20. As the rotor 20 rotates it partially blocks the stator orifices 21 and either significantly restricts the passage of the fluid or else allows it to pass massively. In FIG. 2A, the pressure pulse generator is in the so-called "open" position. The rotor blades 23 do not coincide with the orifices 21 and the flow of fluid through the pressure pulse generator is maximal. A communicating area can be defined for the fluid passage, corresponding to the stator orifices, for example triangles whose sides are approximately 20, 30, and 30 millimeters.

In FIG. 2B, the pressure pulse generator is in the so-called "closed" position. The rotor blades partially block the orifices 21 of the stator 20 and the fluid flow through the pressure pulse generator is minimal. The pressure pulse generator does not totally prevent the passage of the fluid. Since this fluid serves to lubricate the drilling tool, it is necessary for it to permanently circulate in the drillpipe string so that drilling operations can continue. When the blades 23 of the rotor 22 are opposite the stator orifices 21, the orifices 21 have an unblocked space 24. The communicating area for the fluid is the spaces 24, for example rectangles approximately 28×4 millimeters.

Figure 4:
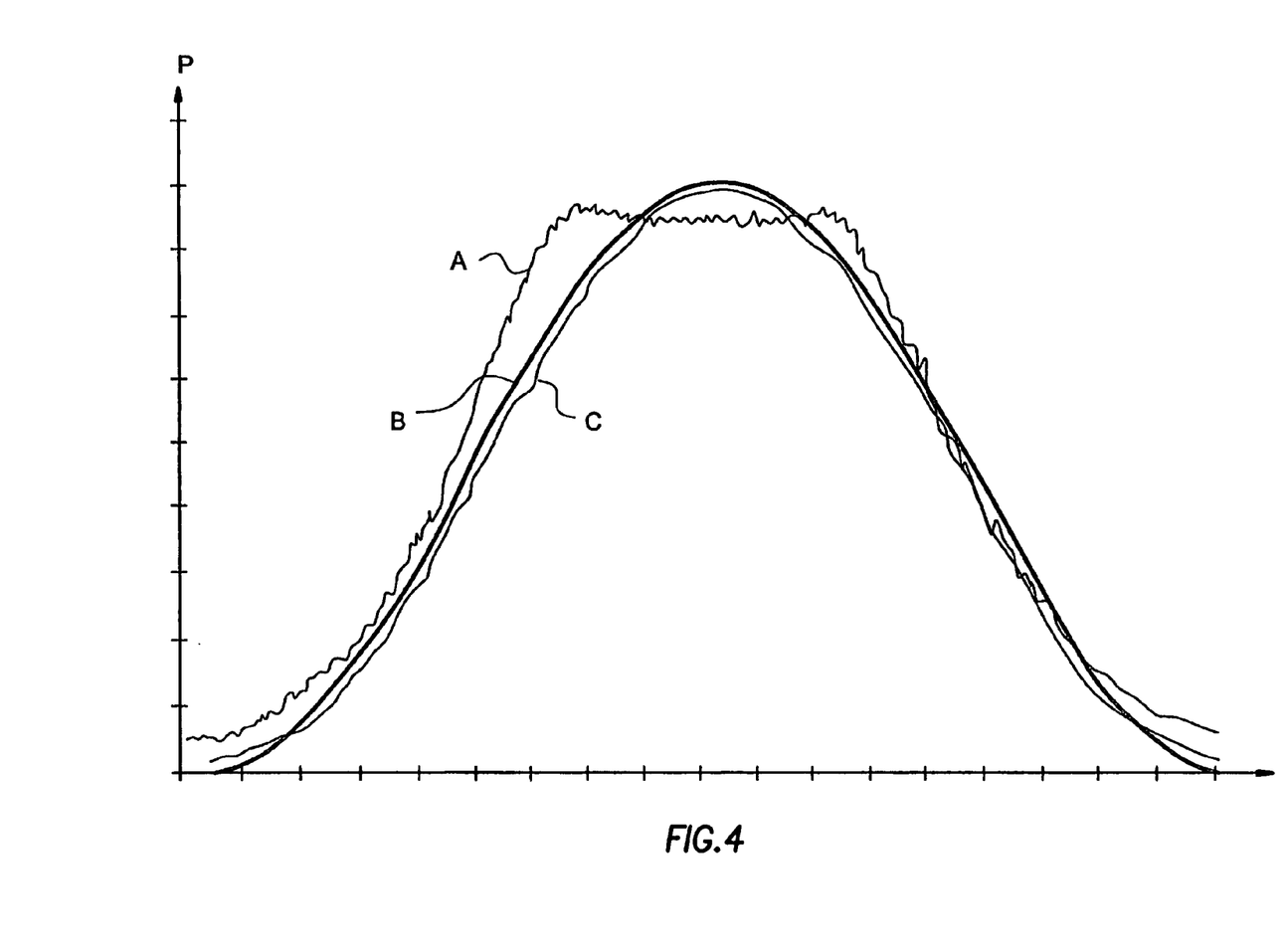
FIG. 4 shows the pressure pulses generated by the pulse generator in FIG. 2 (curve A) and FIG. 3 (curve C), to be compared to a pure sinusoid (curve B)

As the rotor 22 rotates, it generates a fluid flow downstream of the pressure pulse generator in which the pressure falls and rises at the rate of rotation. The pressure pulses generated by the generator rotate at constant speed and are not perfectly sinusoidal. As can be seen in FIG. 4, these pulses are represented with the reference A in FIG. 4. A perfect sinusoid is referenced B. Clipping occurs. Energy is lost in the form of harmonics. These harmonics can interfere with the demodulation of the signal at the surface.

Inevitably, the fluid contains solid particles or debris. In order to be easily removable, this debris must not be too large because it must pass through the peripheral orifices 21 of the stator 20. Since larger debris often appears, the drive motor must be powerful enough so that the rotor can grind it up. When the debris is ground up, it can then be discharged. But grinding up this debris may cause wear to the rotor. If the motor power is not sufficient, the pressure pulse generator seizes and clogs, and this can cause the drillpipe string to be clogged.

In an effort to provide necessary power, pressure pulse generators have been used in combination with turbines. U.S. Pat. No. 5,517,464 describes an integrated modulator and turbine-generator with a turbine impeller coupled by a drive shaft to a modulator rotor downstream from the impeller. The turbine impeller is used to drive the modulator rotor, which is coupled to an alternator. Despite this advancement in downhole energy conservation, there is an ever-increasing need for more power in downhole operations. What is needed is a system that is capable of channeling and/or utilizing the force of fluid flowing through the generator to create additional power.

SUMMARY OF INVENTION

This invention proposes a pressure pulse generator, also called a turbo-modulator, which remedies the above disadvantages and/or provides further advantages.

More specifically, the invention proposes a pressure pulse generator that can easily discharge large debris, even in closed position, without grinding it up. The risks of seizing and clogging are considerably reduced. Since the debris can be discharged without being ground up, the pressure pulse generator according to the invention operates with less power. The invention also proposes a pressure pulse generator that generates nearly sinusoidal pressure pulses, so as to increase the efficiency of the telemetry system using such a generator. The invention is provided with a turbine used in combination with the generator to produce downhole power.

In order to achieve this, this invention is a pressure pulse generator containing a stator with an orifice through which a stream of fluid flows and a rotor also equipped with an orifice. The rotor is intended to turn opposite the stator to allow more or less fluid coming out of the stator orifice to flow. The two orifices present a communicating area for the flow of the fluid stream. This communicating area varies between a maximum and a minimum area depending on the position of the rotor with respect to the stator. The communicating area can vary in basically a sinusoidal manner.

This communicating area comprises one section located in a central area of the stator-rotor assembly regardless of the position of the rotor with respect to the stator.

The stator orifice may have a central section located in the central area of the stator and at least one lobe that communicates with the central section. Similarly, the rotor orifice may have a central section located in a central area of the rotor and at least one lobe that communicates with the central section. Advantageously, this central section is preferably circular. The lobe may be part of a sector of a circle.

In an alternative, the lobe is preferably part of a trapezoid.

The number of lobes of an orifice contributes to determining the period of the pressure pulses. A particularly interesting shape for at least one of the orifices is preferably a rectangular shape. This rectangle is preferably centered. In this configuration, the pressure pulses are preferably sinusoidal when the rotor rotates preferably at a constant speed. Another particularly interesting shape for at least one of the orifices is a cross shape.

The amplitude of the pressure pulses is determined by the difference between the maximum and minimum cross-sections.

With a pulse generator according to the invention, the debris contained in the fluid is carried by the rotor towards the section located in the central area of the stator-rotor assembly.

This invention also concerns a logging-while-drilling tool that has a pressure pulse generator characterized in this way.

This invention also concerns a measuring-while-drilling tool that has a pressure pulse generator characterized in this way.

This invention also concerns a telemetry system that has a pressure pulse generator characterized in this way.

In at least one aspect, the invention relates to a pressure pulse generator comprising a stator with an orifice intended for the passage of a stream of fluid and a rotor adapted to rotate opposite the stator in order to permit the through flow of fluid to exit the orifice of the stator. The generator is characterized by the fact that the rotor is also equipped with an orifice, both orifices presenting a communicating area for the passage of the stream of fluid. The generator may also include a turbine connected to the rotor.

In another aspect, the invention relates to a pressure pulse generator comprising a stator with a stator orifice intended for the passage of a stream of fluid, a rotor adapted to rotate opposite the stator for selectively permitting the flow of fluid exiting the orifice of the stator to pass through the rotor, and a turbine operatively connected to the rotor. The rotor equipped with a rotor orifice. The orifices defining a communicating area for the passage of the stream of fluid. The turbine having blades rotatable in response to the flow of fluid through the rotor.

In another aspect, the invention relates to a pressure pulse generator for a downhole drilling tool. The downhole drilling tool has a fluid passing therethrough. The pressure pulse generator comprises a stator, a rotor and a turbine. The stator has a stator orifice adapted to permit the fluid to flow therethrough and defines a plurality of stator lobes. The rotor is positioned adjacent the stator orifice and has a rotor orifice defining a plurality of rotor lobes of corresponding dimension to the stator lobes. The rotor is adapted to rotate with respect to the stator such that the fluid selectively passes therethrough. The rotor has a channel therethrough and at least one port to permit the fluid to exit the rotor. The turbine is connected to the rotor and has at least one blade. The turbine is rotationally driven by the flow of fluid through the rotor and over the at least one blade whereby power is provided to the downhole tool.

In yet another aspect, the invention relates to a method of generating power in a downhole tool. The steps include selectively passing a fluid through an orifice of a stator and a corresponding orifice of a rotor in the downhole tool, passing the fluid through the rotor and out one or more exit ports therein and generating rotational energy by passing the fluid from at least one exit port over at least one turbine blade of a turbine operatively connected to the rotor.

Other aspects will be discernable from the following description.

BRIEF DESCRIPTION OF DRAWINGS

This invention will be better understood by reading the description of the examples given purely for information and without limitation, referring to the attached drawings, in which.

In these figures, the identical or similar elements are designated by the same reference characters. For the sake of clarity, the figures are not necessarily to scale.

DETAILED DESCRIPTION

Figure 3A:
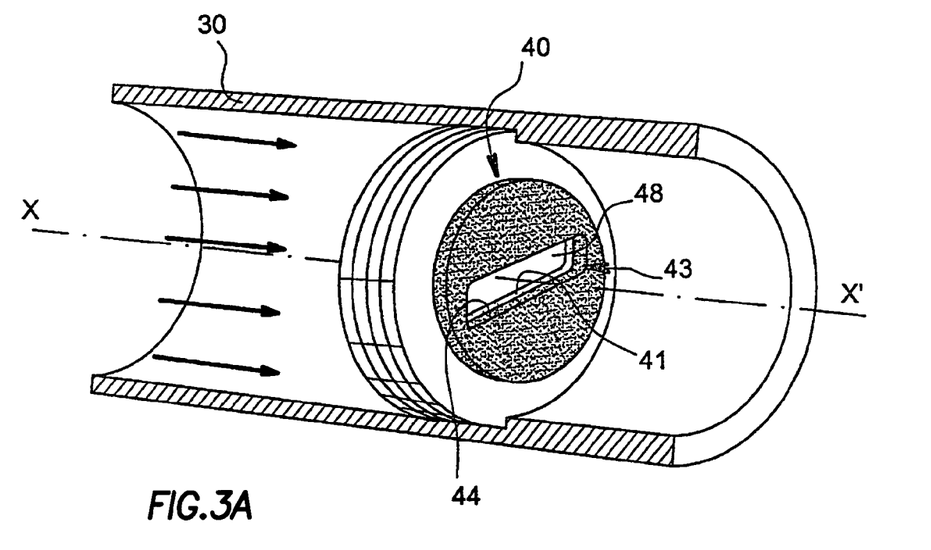
FIGS. 3A, 3B show an example of a pressure pulse generator according to the invention in the open and closed positions, respectively.
Figure 3B:
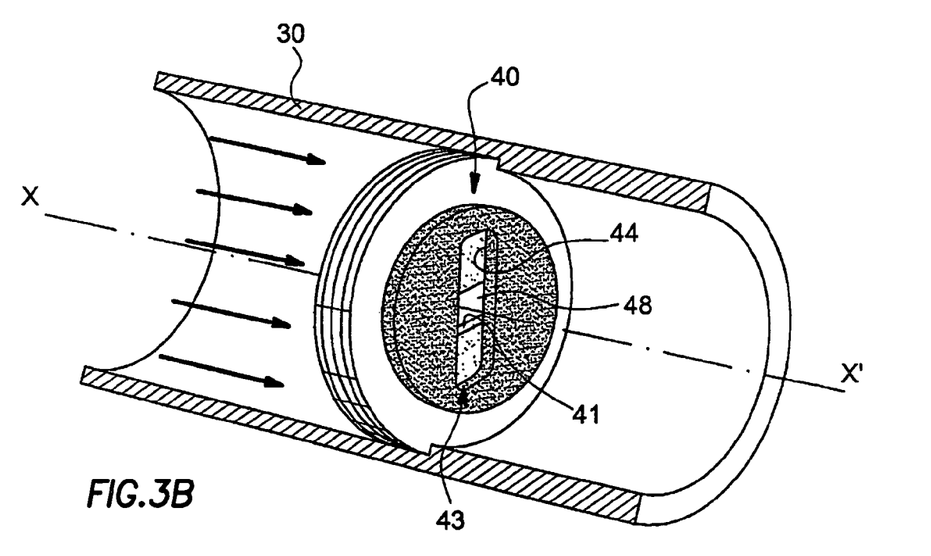

Referring to FIGS. 3A, 3B, which show a pressure pulse generator according to the invention, this pulse generator is intended to generate pressure pulses in a stream of fluid, which may be a drilling fluid used in a drilling device equipped with a telemetry system like the one in FIG. 1.

Note that there is a stator 40 that cooperates with a rotor 43, and the stator 40-rotor 43 assembly is placed inside a drillpipe 30 in a drillpipe string. The stator 40 has an orifice 41. The rotor 43 also has an orifice 44. In order to generate the pressure pulses in the fluid stream, illustrated by the arrows, the fluid enters the pressure pulse generator from the stator 40 side. The fluid passes through the orifice 41 of the stator 40. When it leaves the orifice 41 of the stator 40, the fluid goes to the orifice 44 of the rotor 43, which is opposite the stator 40. A motor (not shown) drives the rotating rotor 43 around an axis xx' parallel to the fluid stream.

When the rotor 43 rotates, it allows more or less fluid from the orifice 41 of the stator 40 to flow. The two orifices 41, 44 define a communicating area (or intersection) 48 for the passage of the fluid, varying between a minimum and a maximum cross-section. This communicating area 48 includes a section located in a central area of the stator-rotor assembly regardless of the position of the rotor with respect to the stator. The axis xx' is contained in this communicating area 48. The central area is an area that includes the center of the rotor-stator assembly. In FIG. 3A, the generator is in the "open" position, in which the communicating area 48 is maximal. In FIG. 3B, the generator is in the "closed" position, in which the communication cross-section 48 is minimal.

In general, the orifice 41 of the stator 40 includes a central section 42, i.e., located in a central area of the stator 40, and at least one lobe 46 that communicates with the central section 42. This central section 42 and this lobe 46 are visible in FIG. 5B.

Similarly, the orifice 44 of the rotor 43 includes a central section 45, i.e., located in a central area of the rotor 43, and at least one lobe 47 that communicates with the central section 45. This central section 45 and this lobe 47 are visible in FIG. 5B.

With such a configuration for the orifices 41, 44 of the stator 40 and the rotor 43, the communicating area 48 is achieved for the passage of the fluid with the section located in a central area of the stator-rotor assembly. Orifices 41, 44 of the rotor and stator can be identical as in FIGS. 3A, 3B, but could have been different shapes.

Figure 5A:
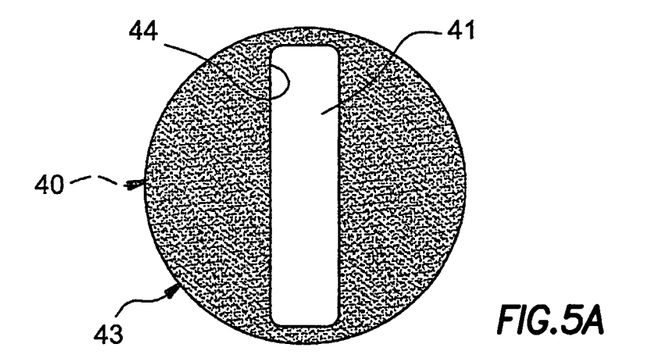
FIGS. 5A, 5B show the front of the stator-rotor assembly of a pressure pulse generator according to the invention in the open and closed positions, respectively.
Figure 5B:
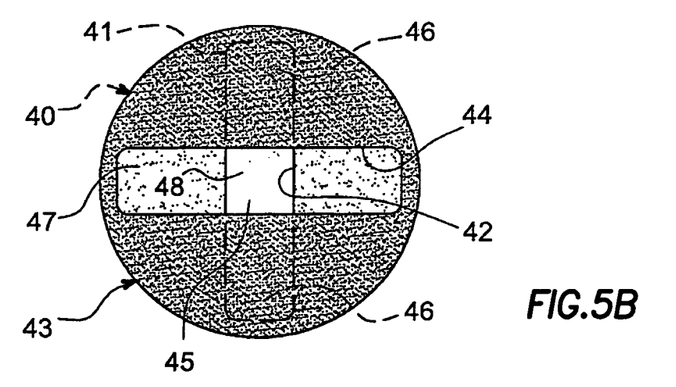

In FIGS. 5A, 5B, orifices 41, 44 are both rectangular and are centered on axis xx'. Then in the center of the rectangle is the central section 42, 45 and on either side the two lobes 46, 47. When the rotor is driven at constant speed, such a configuration makes it possible to generate preferably sinusoidal pressure pulses, referenced C in FIG. 4. There is practically no loss of energy in the form of harmonics. The communicating cross-section varies in preferably a sinusoidal manner. The pressure pulse generator has an increased efficiency and better signal demodulation can be achieved at the surface. This shape of pressure pulses was not possible with the prior art generator illustrated in FIGS. 2A, 2B.

FIGS. 5A, 5B schematically show the front view of the rotor 43 of the pressure pulse generator according to the invention and, hidden behind the rotor 43, the stator 40. The latter is visible only by its orifice 41. In this embodiment, the orifices 41, 44 of the stator 40 and the rotor 43 are preferably identical, rectangular and centered. In FIG. 5A the orifices 41, 44 are aligned and coincide. The angle of the rotor 43 to the stator 40 is zero modulo π. The area for the passage of the stream of fluid, i.e., the communicating surface area between the two orifices 41, 44, is maximal and is the same as the surface area of the orifices 41, 44. The pressure drop of the stream of fluid through the pressure pulse generator is minimal. The orifices 41, 44 may have the following dimensions 75 millimeters×20 millimeters but this invention is not limited to a pressure pulse generator whose rotor and stator orifices have these dimensions. Any debris smaller than the aforesaid dimensions can go through the pressure pulse generator.

In FIG. 5B, the rotor 43 has rotated π/2 modulo π, and now the two orifices 41, 44 are offset with respect to one another. The lobes 46, 47 are located on either side of the communicating area.

The communicating area 48 is minimal and is represented by the intersection between the two orifices 41, 44, i.e., the small central white square. The pressure drop of the stream of fluid through the pressure pulse generator is maximal in this case. The dimensions of the communicating area between the two orifices 41, 44 are preferably 20 millimeters×20 millimeters. The central sections of the orifice 41 of the stator 40 and the orifice 44 of the rotor 43 are represented by the communicating area 48 between the two orifices 41, 44. Any debris whose dimensions are smaller than these dimensions can go through the pressure pulse generator. The risk of clogging is much smaller than with the structure in FIG. 2.

Figure 6:
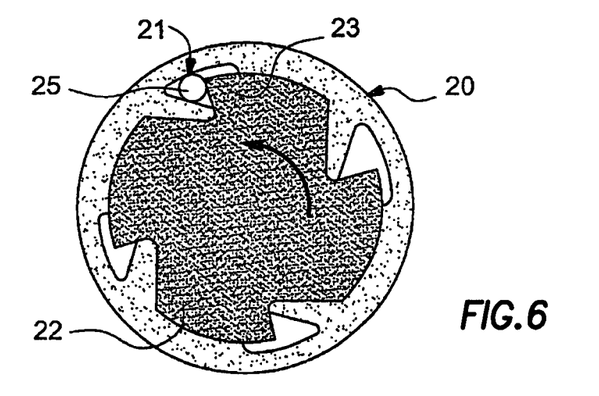
FIG. 6 shows debris lodged in the prior art pressure pulse generator.

We now refer to FIG. 6, which shows a front view of the stator-rotor assembly of the pressure pulse generator from FIGS. 2A, 2B. This figure helps explain why the risks of clogging are high in this configuration. The orifices 21 of the stator 20 are peripheral and preferably triangular. When the blades 23 of the rotor 22 are rotating, they push the debris 25 into a corner of a triangular orifice 21 of the stator 20. The debris is stuck between one of the blades 23 of the rotor 22 and one of the corners of an orifice 21 of the stator 20, as shown in the figure. If the rotor's drive motor is powerful enough so that the debris 25 is ground up and discharged, the pulse generator can continue to function, but the blade 23 of the rotor 22 that acted could be damaged.

If the motor is not powerful enough to grind up the debris 25, the pressure pulse generator could go into a de-clogging cycle, with the rotor 22 rotating back and forth several times until the debris 25 is ground up. Increased energy consumption will occur and the rotor 22 is even more likely to be damaged.

If the debris 25 is still not ground up after a certain period, the situation becomes critical. One solution is to stop everything and pull the string of drillpipe up to the surface in order to access the pressure pulse generator.

Figure 7A:
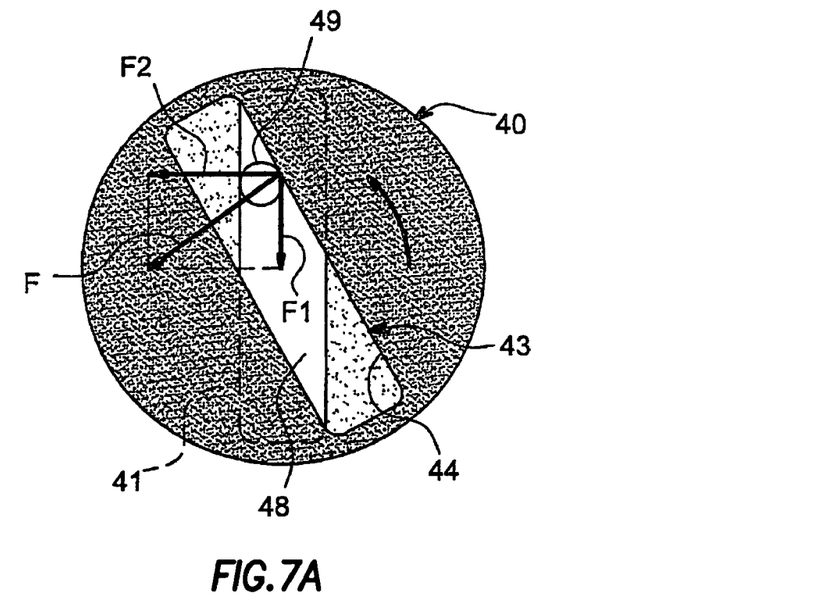
FIGS. 7A, 7B show the trajectory followed by the debris before being evacuated in a pressure pulse generator according to the invention.
Figure 7B:
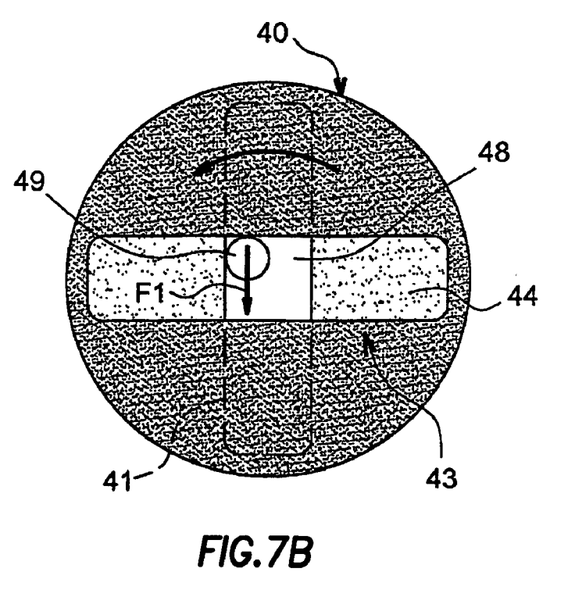

We now refer to FIGS. 7A, 7B, which show why the pressure pulse generator according to the invention makes it possible to easily eliminate debris.

When debris 49 arrives from a peripheral location, it is carried forward by the rotor 43, which applies a force F to it. This force F is made up of two orthogonal components F1, F2. This force F tends to move the debris 49 closer to the central area of the stator-rotor assembly and therefore to push it towards the communicating area between the orifice 41 of the stator 40 and the orifice 44 of the rotor 43.

When the pressure pulse generator is in the closed position as in FIG. 7B, the force applied to the debris 49 has only one component F1. The debris 49 is located at the communicating area 48 and can be discharged if it has the appropriate dimensions. If it is too large, it can be discharged when the rotor 43 is offset $\pi/2$ from the position shown in FIG. 7B and the communicating section 48 between the orifice 41 of the stator 40 and the orifice 44 of the rotor 43 becomes maximal. The risk of clogging is considerably reduced compared to the configuration in FIGS. 2 and 6.

The pressure pulse generator according to the invention makes it possible to eliminate larger debris because there is only one central fluid passage area regardless of the position of the rotor with respect to the stator. In the prior art, the fluid passage area was always broken up.

The number of lobes either a rotor or a stator orifice has contributes to determining the period of the pressure pulses generated. A two-lobed configuration of both the stator orifice and the rotor orifice, as in FIG. 6, results in a period $\pi$, while a four-lobed configuration as in FIG. 8A results in a period $\pi/2$. More generally, a configuration with n lobes (n being a whole number other than zero) in both the rotor orifice and the stator orifice results in a period $2\pi/n$. If the rotor and stator orifices do not have the same number of lobes, this becomes more complicated.

It should be noted that for maximum passage areas of equal value, configurations with few lobes (one or two) make it possible to discharge the largest debris.

Figure 8A:
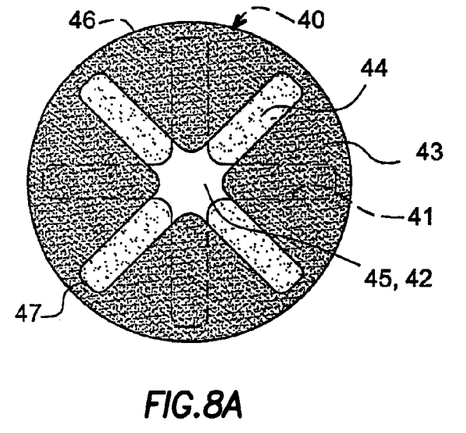
FIGS. 8A, 8B show the front of a pressure pulse generator according to the invention with four-lobed orifices, and the shape of the pressure pulses generated.

FIG. 8A shows an example of a pressure pulse generator according to the invention in which both the stator and the rotor orifices have the shape of a four-legged cross. These orifices take on the shape of two rectangles offset by $\pi/2$. The corners of the rectangles are rounded. These orifices 41, 44 have a central section 42, 45 and four lobes 46, 47, respectively. In the closed position, as in FIG. 8A, the fluid passage area becomes more and more complex as the number of lobes increases.

Figure 8B:
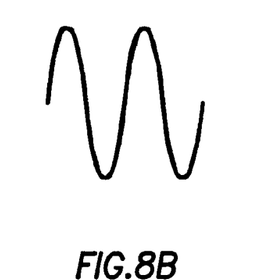

FIG. 8B shows the appearance of the pressure pulses generated by such a pressure pulse generator. These pulses are preferably sinusoidal and their period is half that shown in FIG. 5. The amplitude of the pressure pulses generated is controlled by the difference between the maximum communication area and the minimum communication area, i.e., the difference between the fluid passage area in the open position and the fluid passage area in the closed position.

The geometry of the stator and rotor orifices controls the shape of the pressure pulses generated. A centered rectangular shape generates nearly sinusoidal pulses. Other contours are of course possible.

Figure 9A:
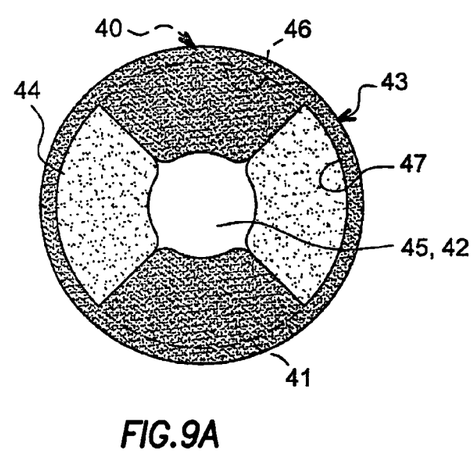
FIGS. 9A, 9B show the front of a pressure pulse generator according to the invention with two sector lobe orifices and the shape of the pressure pulses generated.
Figure 9B:
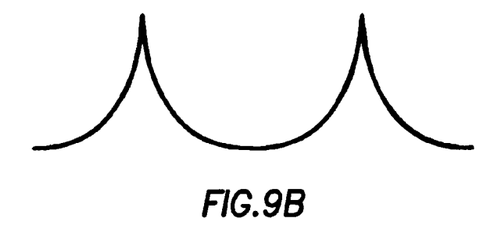

It is possible, for example, to give the rotor and stator orifices a geometry such as the one illustrated in FIG. 9A. The rotor and stator orifices are preferably identical. Each of the orifices 41, 44 preferably has a circular central section 42, 45 with two diametrically opposed sector-shaped lobes 46, 47. These sectors are approximately equal to $\pi/2$. When the generator is in the closed position, the communicating area at the two orifices 41, 44 corresponds to the central section 42. FIG. 9B shows the shape of the pulses generated with a pressure pulse generator of the type in FIG. 9A. This shape is relatively far from a pure sinusoid.

Figure 10A:
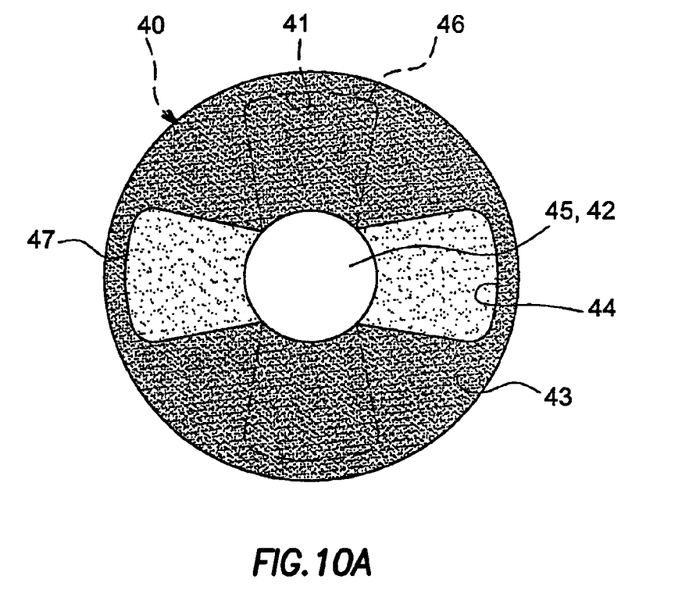
FIGS. 10A and 10B show the front of a pressure pulse generator according to the invention with optimized two-lobed orifices and the shape of the pressure pulses generated.

It is possible to finely adjust the geometry of the orifices 41, 44 in order on the one hand to optimize the shape of the pressure pulses generated and on the other hand to obtain the largest possible minimum communicating area. FIG. 10A shows such an optimized shape for the orifices 41, 44 of the stator 40 and the rotor 43. It is derived from the centered rectangular orifice. Each of the orifices 41, 44 preferably has a circular central section 42, 45 and two lobes 46, 47 that communicate with the central opening 42, 45. These two lobes are diametrically opposed and slightly flared and curved.

Figure 10B:
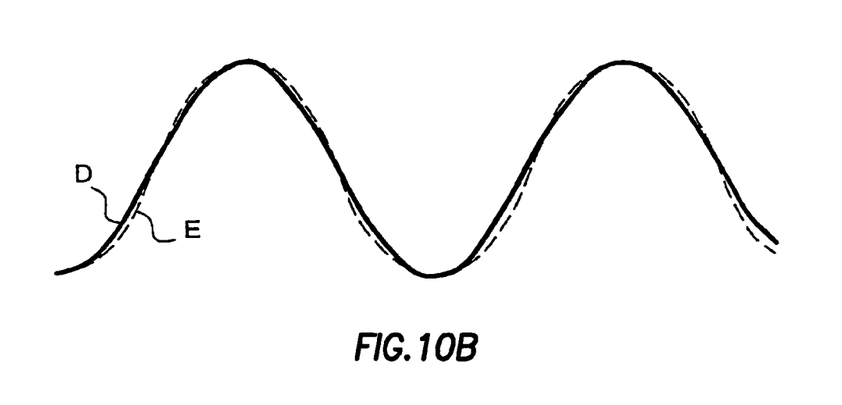

FIG. 10B illustrates the shape of the pulses generated (curve D) by the pressure pulse generator in FIG. 10A, and this shape can be compared to a perfect sinusoid (curve E).

Figure 10C:
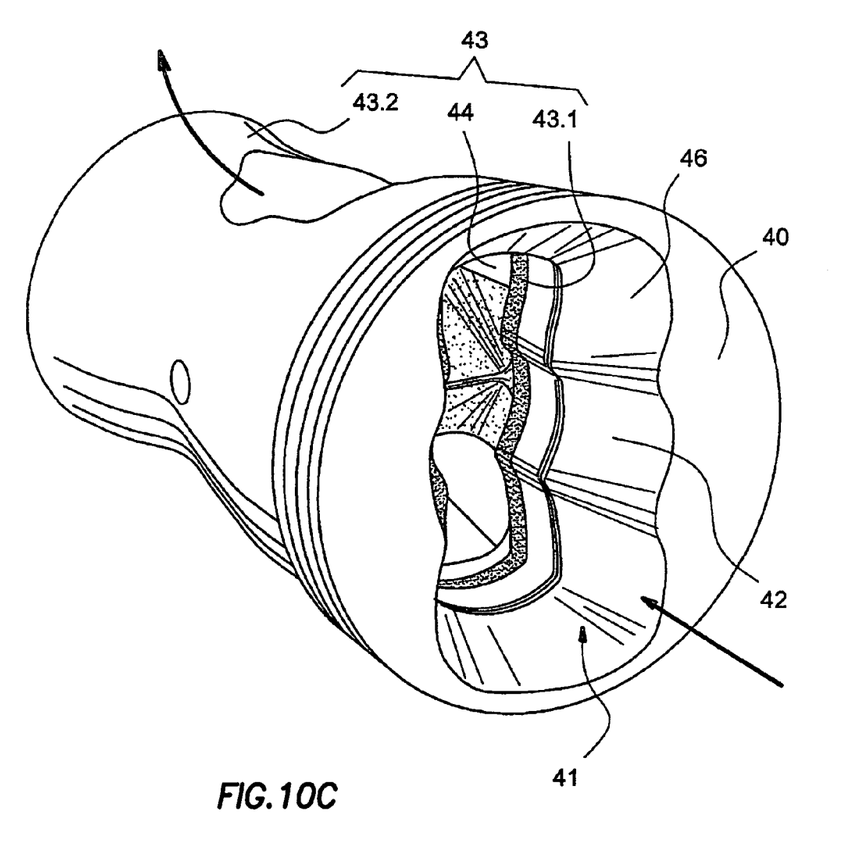
FIG. 10C shows a three dimensional view of a pressure pulse generator according to the invention.

FIG. 10C illustrates a three-dimensional view of a pressure pulse generator according to the invention with the configuration in FIG. 10A. The pressure pulse generator is in the open position. The arrows show the direction of fluid flow. The rotor 43 is shown in its entirety because in the preceding figures it was only schematicized by a first section 43.1 nearest the stator 40. This first section 43.1 communicates with a second section 43.2 in the shape of a funnel to discharge the stream of fluid exiting the rotor. The first section 43.1 is made of a particularly strong material because it receives the brunt of the debris mixed into the fluid. The rotor drive motor (not shown) would be placed downstream of the rotor.

Figure 11A:
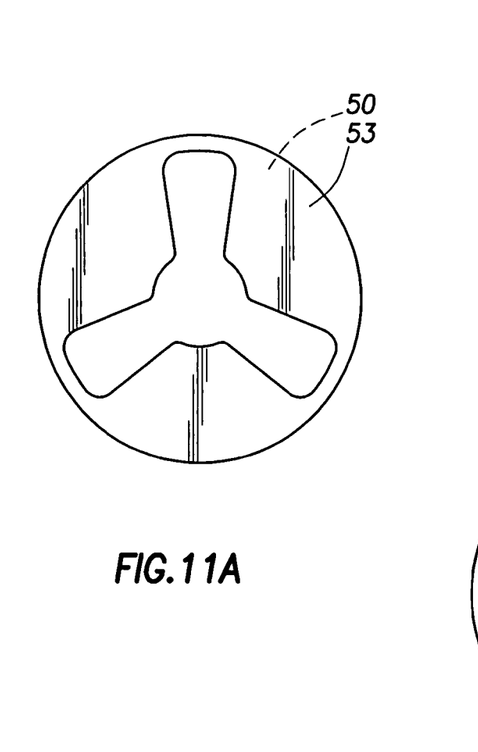
FIGS. 11A, 11B, 11C and 11D show the front of a pressure pulse generator according to the invention with three-lobed orifices and the shape of the pressure pulses generated.
Figure 11B:
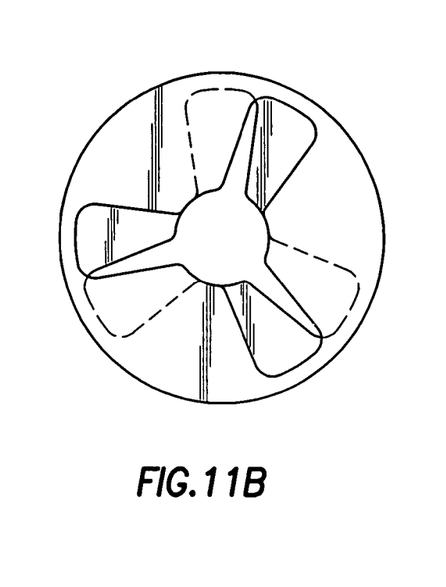
Figure 11C:
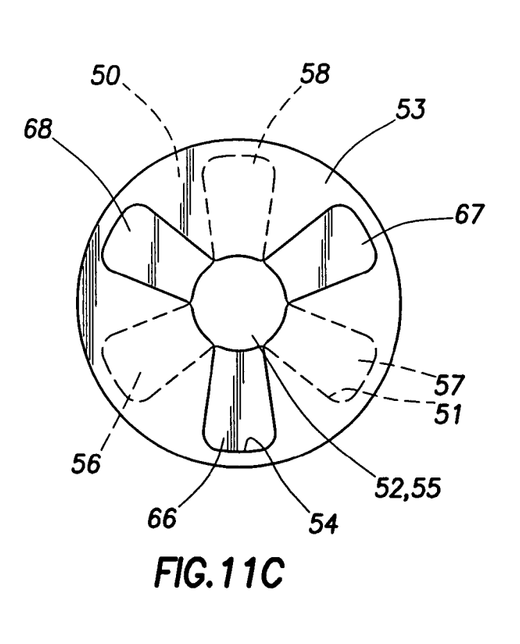

FIGS. 11A, 11B and 11C depict another proposed shape for the orifices 51, 54 of a stator 50 and a rotor 53, respectively. Each of these figures show the rotor in a different rotational position with respect to the stator. FIG. 11A shows the rotor aligned with the stator at zero degrees rotation, or the "open" position. FIG. 11B shows the rotor in an intermediate position with respect to the stator at the thirty degrees rotation. FIG. 11C shows the rotor in non-alignment with the stator at sixty degrees rotation, or the "closed" position.

The stator orifice 51 preferably has a circular central opening 52 and three lobes 56, 57, 58 that communicate with the central openings 52. The rotor orifice 54 preferably has a circular central opening 55 and three lobes 66, 67, 68 that communicate with the central openings 55. The lobes are preferably equally spaced and slightly flared and curved. While three, flared lobes are depicted, any number or shape may be used.

Figure 11D:
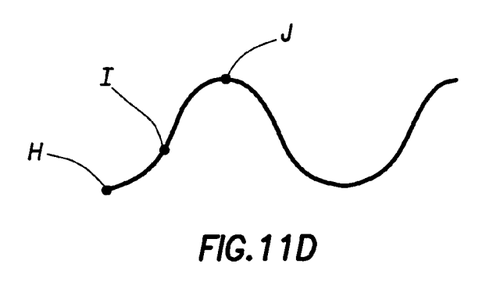

FIG. 11D illustrates the shape of the pulses generated by the pressure pulse generator of FIGS. 11A, 11B and 11C. Points H, I and J depict the pressure drop corresponding to the position of the rotor as depicted in FIGS. 11A, 11B and 11C, respectively.

Various pressure pulse curves are depicted in FIGS. 8B, 9B, 10B and 11D corresponding to the flow of fluid in various rotor/stator configurations. FIGS. 8B, 10B and 11D depict sinusoidal waves generated by rotation of the rotor at constant speed. FIG. 9B is also rotating at a constant speed, but generates a non-sinusoidal wave based on the geometry of the rotor/stator configuration. However, by varying the speed of the rotor/stator configuration of FIG. 9A over each period p, a sinusoidal wave may also be generated. In this manner, the variation of speeds and geometries may be manipulated to generate the desired wave. Additionally, the distance between the rotor and stator may be adjusted to provide variations in the pressure pulse amplitude. The closer the rotor is to the stator, the higher the pressure pulse amplitude.

Figure 11E:
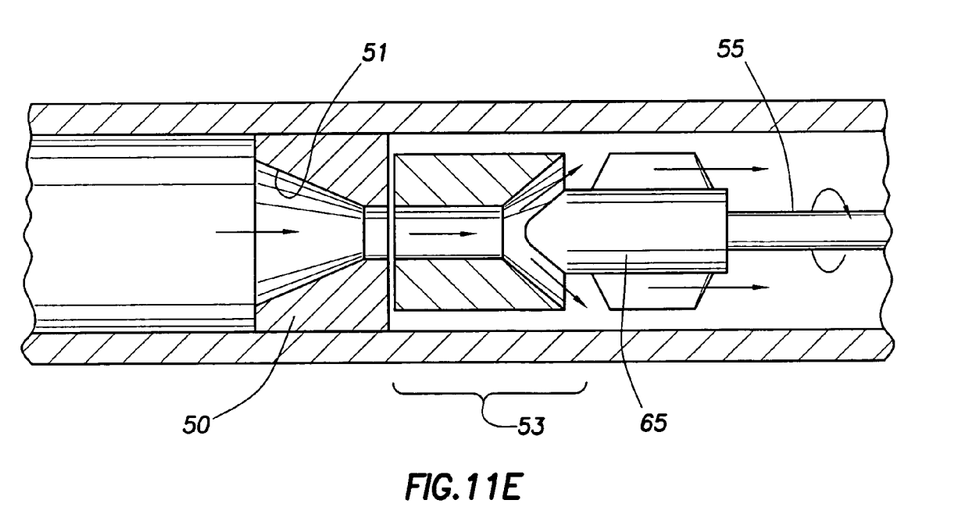
FIGS. 11E and 11F show a schematic view, partially in cross-section, and a three-dimensional view, respectively, of a pressure pulse generator with a turbine according to the invention.

FIG. 11E illustrates a pressure pulse generator usable in conjunction with the rotor/stator configurations depicted in FIGS. 11A, 11B and 11C. FIG. 11E is a cross-sectional view of the generator positioned in a downhole tool, such as the drilling device of FIG. 1. The generator includes a stator 50 having an orifice 51 therethrough, and a rotor 53 positioned adjacent the stator 50. The arrows show the direction of fluid flow through the stator and rotor 53. A rotor shaft 55 is operatively connected to the rotor and rotational driven by the generator as indicated by the curved arrow. A turbine 65 is connected to the rotor 53 and drive shaft 55.

Figure 11F:
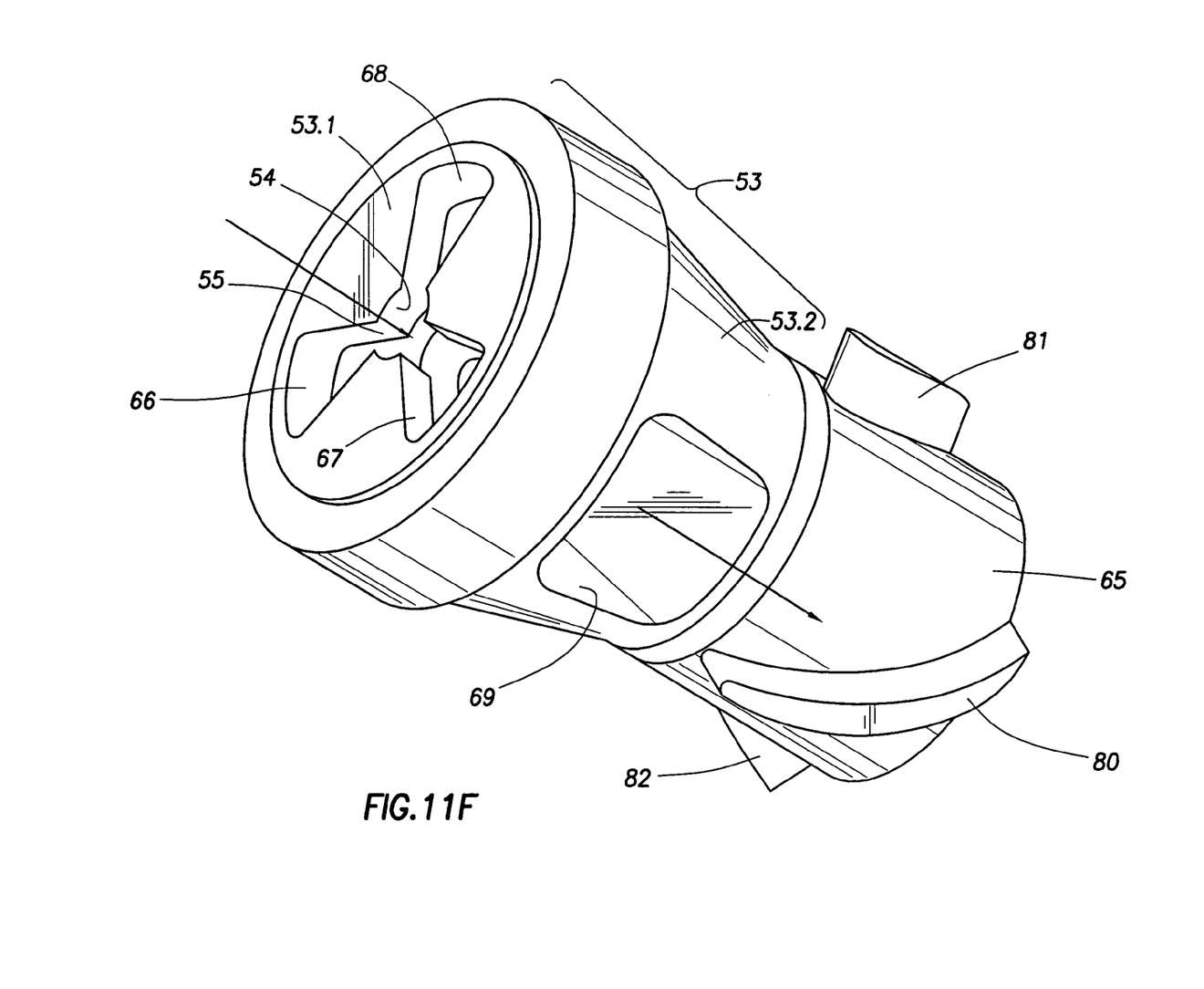

FIG. 11F is a three-dimensional view of a rotor 53 and turbine 65 forming part of the generator of FIG. 11E. The rotor 53 includes a first section 53.1, a second section 53.2. The rotor 53 has an orifice 54 therethrough, lobes 66, 67, 68 and a central section 55 corresponding to the rotor as depicted more fully in FIGS. 11A, 11B and 11C.

Referring still to FIG. 11F, fluid flows through the downhole tool and past the orifice of the stator and the rotor, and into the generator as indicated by the arrow. Fluid flows through the rotor 53 and exits-three ports 69 in the second section 53.2 of the generator. Fluid exiting ports 69 in the rotor flows across one or more of blades 80, 81, 82 of the turbine 65. The force of the fluid pushing against the blades rotates the turbine 65. The rotational force of the blade may then be used to provide power, such as mechanical rotation for the rotor.

The blades of the turbine are preferably adapted to conform to the force of fluid as it passes through the downhole tool to generate maximum power. As shown in FIG. 11F, the blades are curved to increase the surface contact with the fluid exiting the ports 69. However, it will be appreciated that one or more of the blades may be straight, angled, or have other geometries adapted to the flow of fluid. Additionally, the exit port 66 may be angled, shaped, configured or otherwise adjusted to direct flow in the desired direction with respect to the blades. The distance between the exit ports 69 and the blades and/or the distance between the rotor and stator may also be adjusted to increase and/or decrease the force of the fluid against the blade. In this manner, the flow of fluid may be optimized to adjust the power generated by the turbine.

The turbine 65 of FIGS. 11E and 11F is preferably depicted downstream of the rotor 53. The turbine may be located at various positions along the rotor and in the direction of fluid flow through the generator. Additionally, the generator may be inverted with respect to the flow of fluid and run in a "backwards" position in the downhole tool if the blade inclination is also reversed. The rotor shaft may be positioned uphole or downhole from the stator.

Referring again to FIG. 1, assume that reference 13 illustrates a logging-while-drilling tool according to the invention and includes the pressure pulse generator 9 according to the invention. It could of course be assumed that reference 13 represents a measuring-while-drilling tool according to the invention.

Still referring to FIG. 1, the invention also concerns a telemetry system that includes the telemetry module 12 comprising the pressure pulse generator 9 according to the invention 9, the surface pressure sensors 10, and the processing device 11.

Although several embodiments of this invention have been shown and described in detail, it is understandable that various changes and modifications can be made without going outside the scope of the invention. The rotor and/or the stator could have several orifices, the stator and rotor orifices could be different, and of course the shapes shown are not the only possible shapes.

We claim:

1. A pressure pulse generator comprising:
   a stator with a stator orifice intended for the passage of a stream of fluid; and
   a rotor adapted to rotate opposite the stator for selectively permitting the flow of fluid existing the orifice of the stator to pass through the rotor, the rotor equipped with a rotor orifice, the orifices defining a communicating area for the passage of the stream of fluid, the communicating area having a section located in a central area of the stator-rotor assembly; and
   a turbine operatively connected to the rotor, the turbine having blades rotatable in response to the flow of fluid through the rotor.

2. The pressure pulse generator according to claim 1, wherein the communicating area varies between a minimum area and a maximum area depending on the position of the rotor with respect to the stator.

3. The pressure pulse generator according to claim 2, wherein the amplitude of the pressure pulses is determined by the difference between the maximum area and the minimum area.

4. The pressure pulse generator according to claim 1, wherein the communicating area varies in basically a sinusoidal manner.

5. The pressure pulse generator according to claim 4, wherein the section of the communicating area is located in the central area of the stator-rotor assembly regardless of the position of the rotor with respect to the stator.

6. The pressure pulse generator according to claim 1, wherein the communicating area has a section located in a central area of the stator-rotor assembly regardless of the position of the rotor with respect to the stator.

7. The pressure pulse generator according to claim 1, wherein the stator orifice has a central section located in a central area of the stator and at least one lobe that communicates with the central section.

8. The pressure pulse generator according to claim 6, wherein the rotor orifice has a central section located in a central area of the rotor and at least one lobe that communicates with the central section.

9. The pressure pulse generator according to claim 7, wherein at least one of the central sections is circular.

10. The pressure pulse generator according to claim 7, wherein at least one of the lobes is part of a sector of a circle.

11. The pressure pulse generator according to claim 7, wherein at least one of the lobes is part of a trapezoid.

12. The pressure pulse generator according to claim 7, wherein the number of lobes of at least one of the orifices contributes to determining a period of the pressure pulses.

13. The pressure pulse generator according to claim 7, wherein at least one of the orifices is rectangular.

14. The pressure pulse generator according to claim 7, wherein the at least one of the orifices is centered.

15. The pressure pulse generator according to claim 7, wherein at least one of the orifices has the shape of a cross.

16. The pressure pulse generator according to claim 1, wherein the pressure pulses are sinusoidal when the rotor is rotating at constant speed.

17. The pressure pulse generator according to claim 1, wherein the rotor in rotation applies a force to debris contained in the fluid that pushes the debris towards the communicating area.

18. The pressure pulse generator according to claim 1, wherein the pressure pulse generator is contained in a logging-while-drilling tool.

19. The pressure pulse generator according to claim 1, wherein the pressure pulse generator is contained in a measuring-while-drilling tool.

20. The pressure pulse generator according to claim 1, wherein the pressure pulse generator is contained in a telemetry system.

21. The pressure pulse generator according to claim 1, wherein the pressure pulses are non-sinusoidal when the rotor is rotating at constant speed.

22. The pressure pulse generator according to claim 1, wherein the pressure pulses are sinusoidal.

23. The pressure pulse generator according to claim 22, wherein the orifice is non optimized.

24. The pressure pulse generator according to claim 23 wherein the speed is varied over each period of rotation.

25. The pressure pulse generator according to claim 1, wherein the turbine is connected to the rotor via a drive shaft.

26. The pressure pulse generator according to claim 1, wherein the turbine has a plurality of blades.

27. The pressure pulse generator of claim 26 wherein the blades are curved.

28. The pressure pulse generator of claim 26 wherein the rotor has a plurality of exit ports, each blade aligned with a corresponding port.

29. The pressure pulse generator of claim 26 wherein the turbine is positioned downstream of the rotor.

30. A pressure pulse generator for a downhole drilling tool, the downhole drilling tool having a fluid passing therethrough, the pressure pulse generator comprising:
   a stator having a stator orifice adapted to permit the fluid to flow therethrough, the stator orifice defining a plurality of stator lobes;
   a rotor positioned adjacent the stator orifice, the rotor having a rotor orifice defining a plurality of rotor lobes of corresponding dimension to the stator lobes, the rotor adapted to rotate with respect to the stator such that the fluid selectively passes therethrough, the rotor having a channel therethrough and at least one port to permit the fluid to exit, and
   a turbine connected to the rotor, the turbine having at least one blade, the turbine rotationally driven by the flow of fluid from the at least one port and over the at least one blade whereby power is provided to the downhole tool.

31. The pressure pulse generator of claim 30 wherein the stator and rotor have two lobes.

32. The pressure pulse generator of claim 30 wherein the stator and rotor have three lobes.

33. The pressure pulse generator of claim 30 wherein the power is mechanical.

34. The pressure pulse generator of claim 30 wherein the turbine is connected to the rotor by a drive shaft.

35. A method of generating power in a downhole tool, comprising:
   selectively passing a fluid through an orifice of a stator and a corresponding orifice of a rotor in the downhole tool;
   passing the fluid through a rotor and out exit ports therein; and
   generating rotational energy by passing the fluid from the exit ports over at least one turbine blade of a turbine operatively connected to the rotor.

36. The method of claim 35 wherein the step of passing the fluid through the modulator comprises:
   separating the flow of fluid by passing fluid through a rotor and out exit ports therein.

37. The method of claim 35 wherein the power is mechanical.

* * * * *